US012245569B2

(12) United States Patent
Jackson et al.

(10) Patent No.: US 12,245,569 B2
(45) Date of Patent: Mar. 11, 2025

(54) PET TOY (71) Applicant: Doskocil Manufacturing Company, Inc., Arlington, TX (US)

(72) Inventors: Jill Jackson, Fort Worth, TX (US); Ron Bagley, Dallas, TX (US); Sunil Pinto, Arlington, TX (US); Josiah Wilhelm, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 74 days.

(21) Appl. No.: 17/391,351

(22) Filed: Aug. 2, 2021

(65) Prior Publication Data

US 2022/0132803 A1 May 5, 2022

Related U.S. Application Data (60) Provisional application No. 63/107,578, filed on Oct. 30, 2020.

(51) Int. Cl.
*A01K 15/02* (2006.01)

(52) U.S. Cl.
CPC .................... *A01K 15/025* (2013.01)

(58) Field of Classification Search
CPC .... A01K 15/025; A01K 15/026; A01K 15/02; A01K 15/027; A63F 7/40; A63F 2007/4068; A63F 2009/0286; A63F 2007/4012; A63F 2009/0282; A63F 2009/0466
USPC .................................... 119/707, 702
See application file for complete search history.

(56) References Cited

U.S. PATENT DOCUMENTS

| | | | | | |
|---|---|---|---|---|---|
| 2,362,064 | A | * | 11/1944 | Giesinger | A63B 43/002 473/595 |
| 3,073,058 | A | * | 1/1963 | Lemelson | A63H 5/00 446/188 |
| 5,984,813 | A | * | 11/1999 | Cinnella | A63B 37/14 473/613 |
| 8,727,918 | B1 | * | 5/2014 | Gentile | A63B 43/06 473/588 |
| 2006/0009319 | A1 | * | 1/2006 | Nelson | A63B 43/00 473/571 |
| 2010/0240278 | A1 | * | 9/2010 | Neal | A63B 67/14 446/489 |
| 2017/0354849 | A1 | * | 12/2017 | Zarozny | A63B 69/0002 |

* cited by examiner

*Primary Examiner* — Jeffrey R Larsen
(74) *Attorney, Agent, or Firm* — Foley & Lardner LLP (57) ABSTRACT A pet toy includes a body portion and a sliding portion. The body portion has a curved top portion with an inwardly extending arcuate side portion. The sliding portion is attached to a bottom surface of the body portion and is formed from rigid plastic so as to have a reduced coefficient of friction with a surface on which the pet toy is to slide.

9 Claims, 7 Drawing Sheets

PET TOY

RELATED APPLICATIONS

This application claims priority to U.S. Provisional Patent Application No. 63/107,578 filed on Oct. 30, 2020 which is hereby incorporated herein by reference.

BACKGROUND

Field of the Invention

The present invention relates to a pet toy. In particular, the present invention relates to a pet toy that has a body portion and a sliding portion configured to increase indoor pet enjoyment.

Background of the Invention

Many pets spend considerable time in doors with or without owner's present. Therefore, many pet owners attempt to occupy their pets using toys. Some conventional pet toys attempt to increase pet enjoyment and occupation of a pet's attention by providing an internal noise making device. Further, many owners attempt to occupy a pet's attention by playing with pet toys; however, most conventional pet toys require human interaction for a pet to enjoy the toy.

SUMMARY

It has been found that in certain circumstances some owners do not have sufficient time to spend with their pets. Therefore, in these circumstances many pets are not provided with sufficient exercise and can grow bored through the day. Accordingly, an improved pet toy that is capable of occupying a pet without the need for human (or owner) interaction is desired. The embodiments of the pet toy described herein are an improved pet toy that can provide a pet with sufficient exercise and can occupy a pet's attention for an extended period of time.

In view of the state of the known technology, a first aspect of the present disclosure provides a pet toy comprising a body portion and a sliding portion. The body portion has a curved top portion with an arcuate side portion. The sliding portion is attached to a bottom surface of the body portion, and is formed from rigid plastic so as to have a reduced coefficient of friction relative to a surface on which the pet toy is to slide.

In a second aspect of the disclosure according to the first aspect, the arcuate side portion is a first arcuate side portion, and the body portion includes a second arcuate side portion.

In a third aspect of the disclosure according to the first aspect or second aspect, the second arcuate side portion is disposed opposite the first arcuate side portion.

In a fourth aspect of the disclosure according to any of the preceding aspects, the body portion includes a noise making device.

In a fifth aspect of the disclosure according to any of the preceding aspects, the body portion is hollow.

In a sixth aspect of the disclosure according to any of the preceding aspects, the body portion is formed from a flexible material.

In a seventh aspect of the disclosure according to any of the preceding aspects, the sliding portion includes a support member on an upper surface thereof.

In an eighth aspect of the disclosure according to any of the preceding aspects, the rigid plastic is polypropylene.

A ninth aspect of the disclosure is directed to method of producing a pet toy. The method comprises forming a body portion having bottom portion and a curved top portion, the curved top portion including an arcuate side portion, forming a sliding portion from rigid plastic so as to have a reduced coefficient of friction relative to a surface on which the pet toy is to slide, and attaching the sliding portion to the body portion.

In a tenth aspect of the disclosure according to any of the preceding aspects, the arcuate side portion is a first arcuate side portion, and the forming the body portion includes forming a second arcuate side portion.

In an eleventh aspect of the disclosure according to any of the preceding aspects, the forming the second arcuate side portion includes forming the second arcuate side portion opposite the first arcuate side portion.

In a twelfth aspect of the disclosure according to any of the preceding aspects, a noise making device is inserted into the body portion.

In a thirteenth aspect of the disclosure according to any of the preceding aspects, the forming the body portion includes forming the body portion to have a hollow interior.

In a fourteenth aspect of the disclosure according to any of the preceding aspects, the forming the body portion includes forming the body portion from a flexible material.

In a fifteenth aspect of the disclosure according to any of the preceding aspects, the forming the sliding portion includes forming the sliding portion with a support member on an upper surface thereof.

In a sixteenth aspect of the disclosure according to any of the preceding aspects, the forming the sliding portion includes forming the sliding portion from polypropylene.

The pet toy according to the embodiments of the present disclosure provide an improved pet toy that is capable of occupying a pet indoors for extended periods of time. The configuration and materials of the body portion (i.e., the curved top portion with the arcuate side portions) causes the pet toy to shoot out at unexpected or unpredictable angles and directions when stepped on (e.g., by a paw of the pet). The sliding portion is configured to have a low or reduced coefficient of friction relative to many indoor surfaces (such as carpet, tile, wood, etc.), enabling the pet toy to race or shoot and slide across the indoor surface. This sudden unpredictable movement causes the pet's "animal instinct" to be activated or triggered and the pet will chase the toy. Further, the pet toy can have a noise making device—i.e., a "squeaker" or squeaking device—that is activated when the pet toy is stepped on. The noise from the noise making device will further engage the pet. Further, since the pet toy is formed from rubber it can be resistant to pet chewing, prolonging the life of the toy.

As can be understood, the pet toy described herein will increase the occupation of a pet's attention, while also improving the pets exercise, since the pet will chase the pet toy through an indoor area of a home or house or other indoor structure. Further, the pet toy will improve the occupation of a pet's attention without the need for additional food or treats. Thus, as can be understood, the pet toy as described herein will improve a pet's health, by increasing the pet's activity and reduce the pet's boredom by increasing the pet's attention to the toy without the need to human interaction and additional food. Accordingly, pets using the pet toy described will be healthier and happy and owners can be happier.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
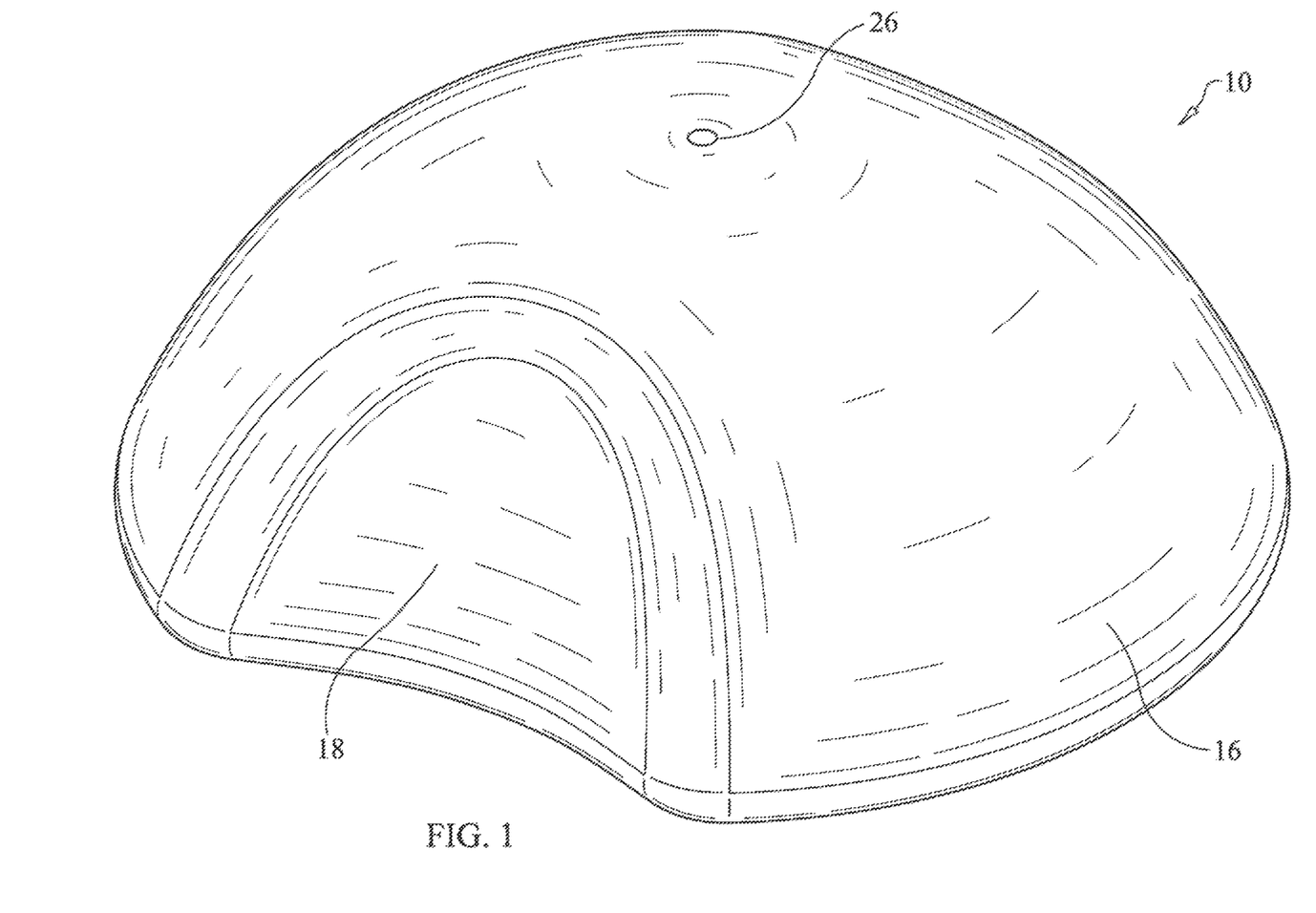
FIG. 1 is a top perspective view of a pet toy according to one embodiment of the present invention.
Figure 2:
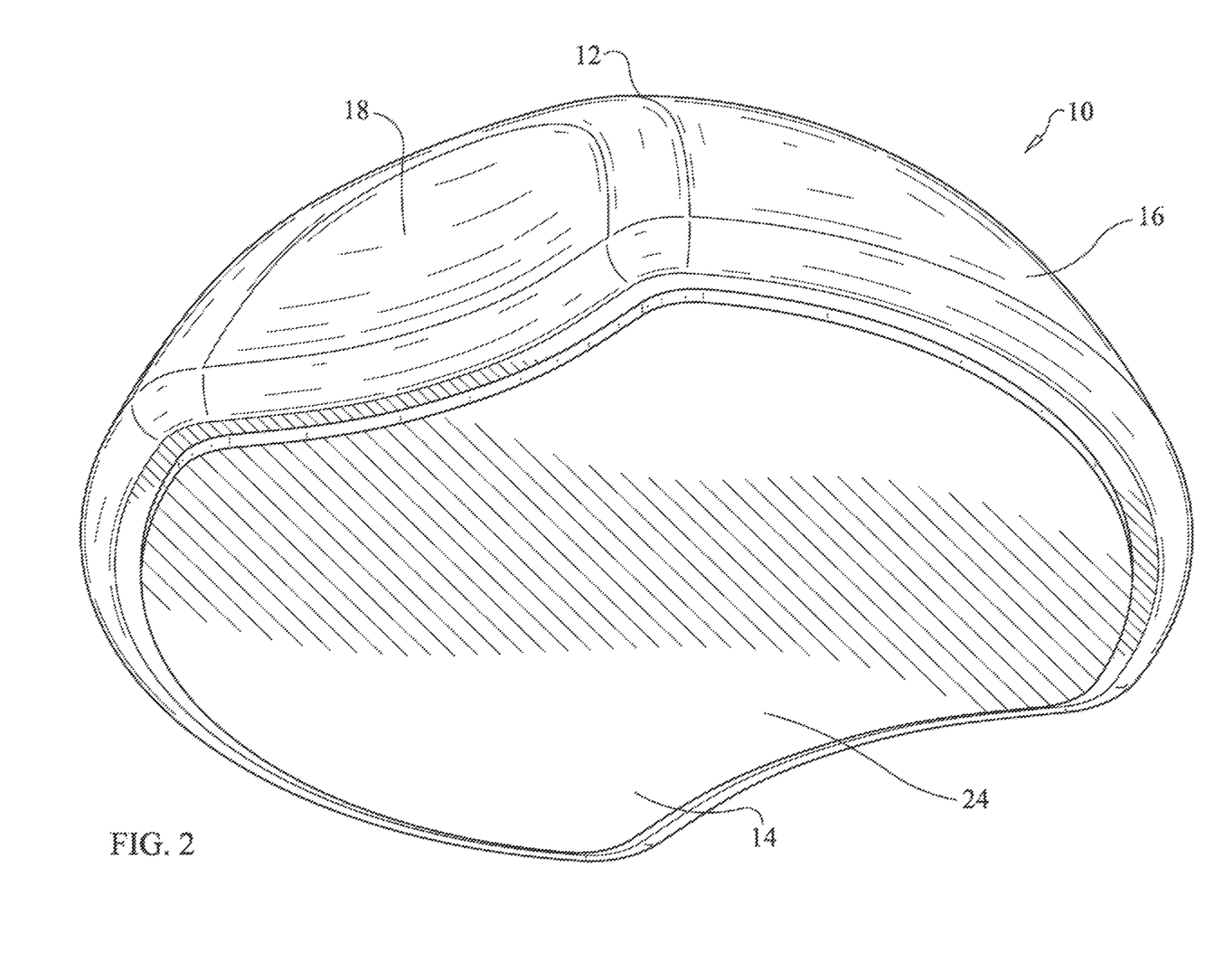
FIG. 2 is bottom perspective view of the pet toy according to FIG. 1.
Figure 3:
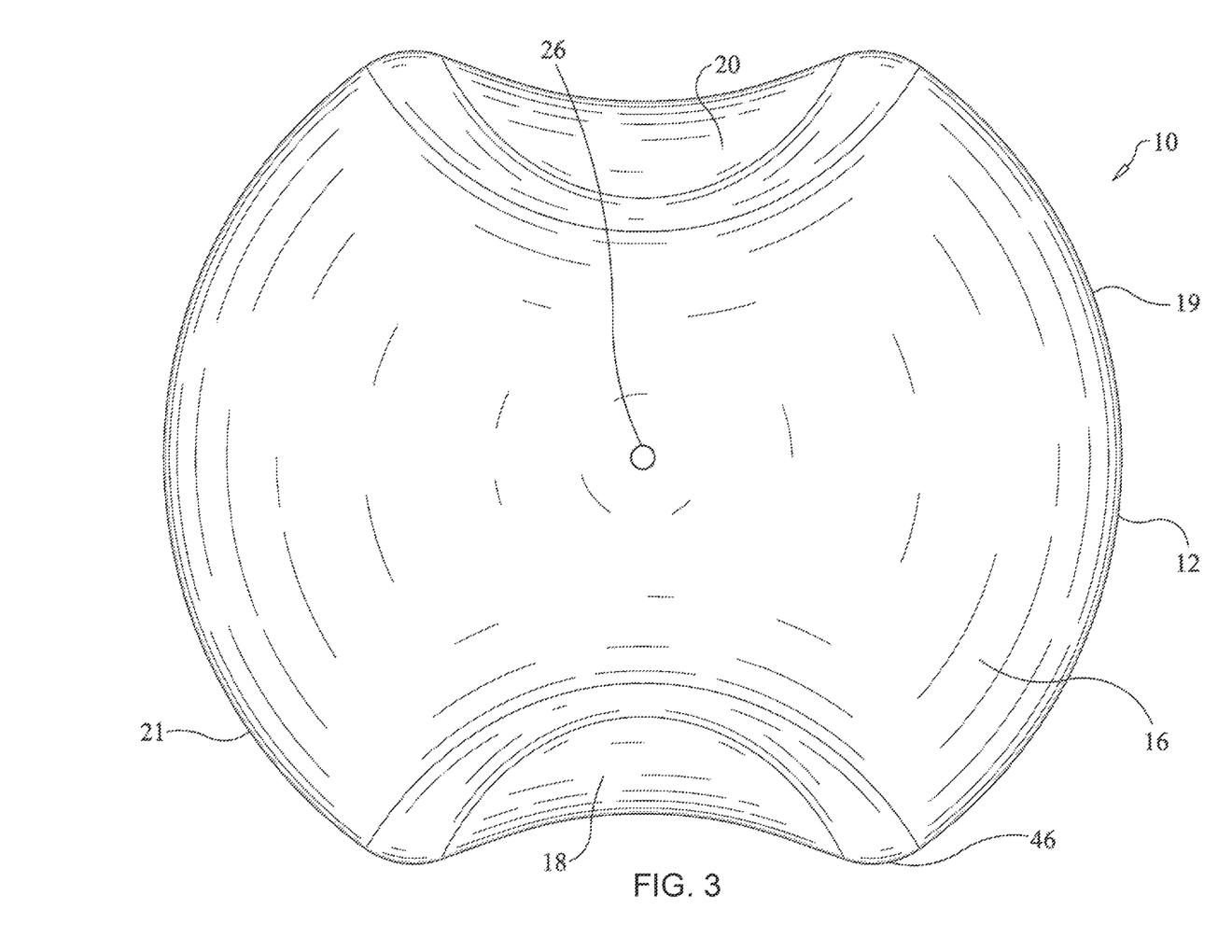
FIG. 3 is a top plan view of the pet toy according to FIG. 1.

Referring initially to FIGS. 1-3, a pet toy 10 is illustrated in accordance with a first embodiment. The pet toy 10 includes a body portion 12 and a sliding portion 14. As can be understood, the pet toy 10 is configured to occupy a pet indoors by sliding on a surface along the sliding portion 14. The body portion 12 is configured such that when the pet contacts the pet toy 10 the toy can move erratically due the configuration or can be propelled due to the combination of materials and the shape of the body portion 12. In other words, when a pet attempts to put vertical pressure on the body portion 12, since the body portion 12 has an arcuate configuration and the body portion 12 is formed form a semi rigid, elastic material, the body portion 12 will be propelled from under the pets paw and move along a surface.

Figure 5:
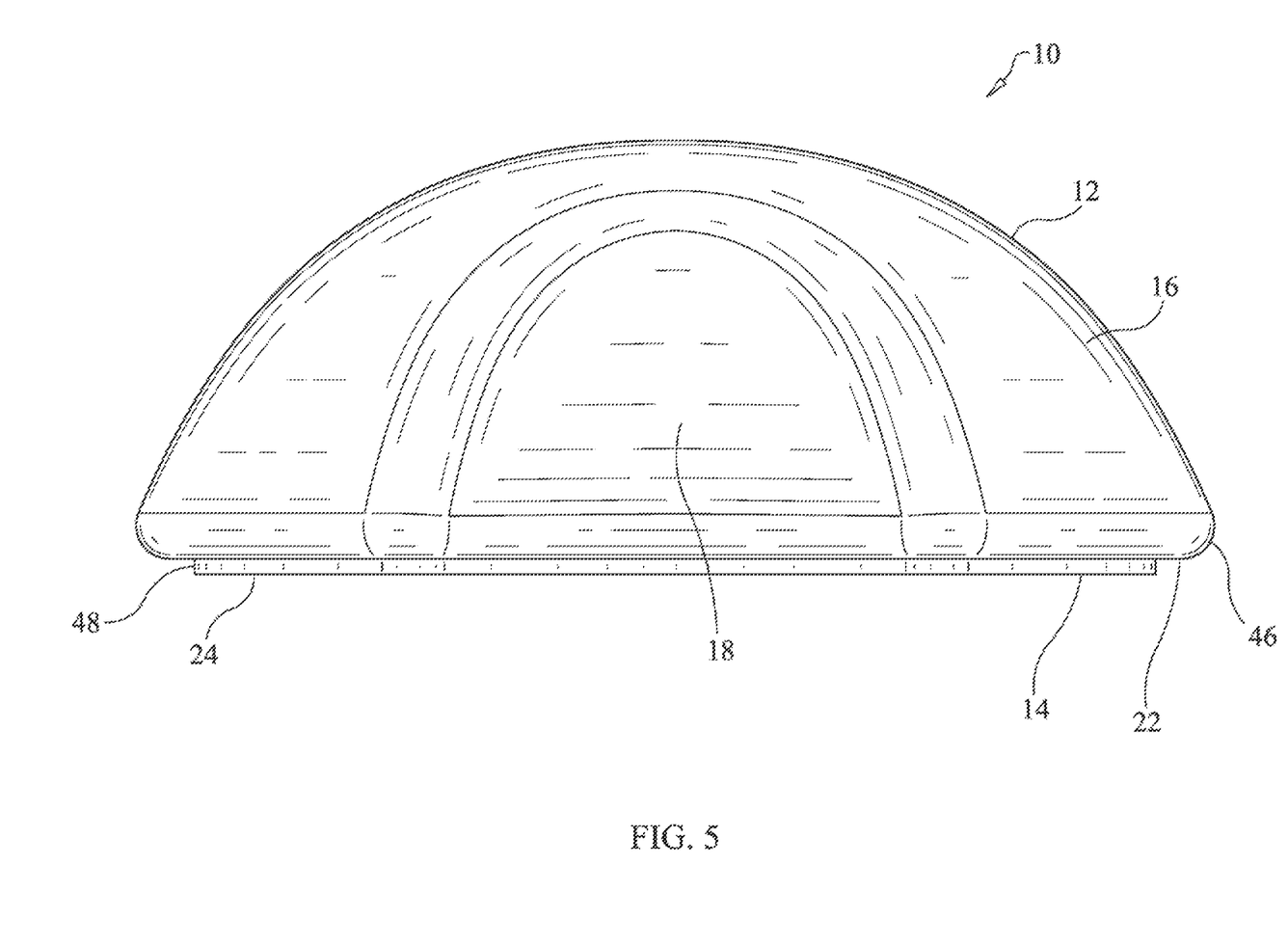
FIG. 5 is a side view of the pet toy according to FIG. 1.
Figure 6:
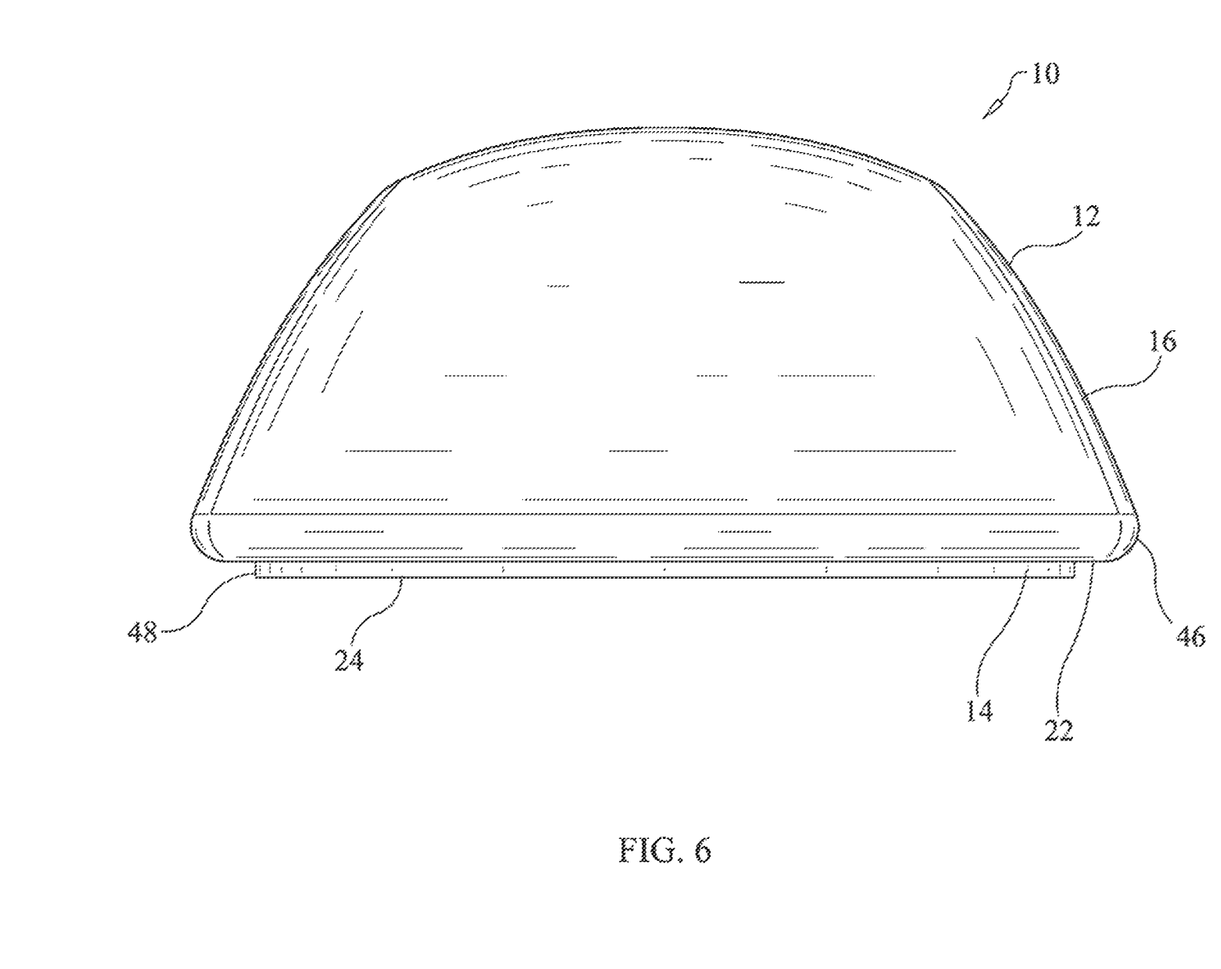
FIG. 6 is a front view of the pet toy according to FIG. 1.

As can be seen in FIGS. 1, 5 and 6, the body portion 12 has a curved top portion 16 with a domed configuration. The curved top portion 16 can have first and second inwardly extending arcuate or concaved side portions 18 and 20. That is, the body portion 12 is generally semi-spherical with a rounded or curved top portion and 16 a flat bottom portion 22. In some embodiments, the body portion 12 can be made from rubber or any other suitable flexible material or semi rigid. That is, the body portion 12 can be configured to having sufficient flexible such that when sufficient force is applied in a direction transverse to the surface on which the pet toy 10 is disposed, the body portion 12 can be slightly deformed or depressed. However, it is noted that the body portion 12 can be sufficiently rigid, such that the force on the rounded body portion 12 causes the toy to "shoot" out from underneath of the object (e.g., paw) that is pressing on the surface. This "shooting" out of the pet toy 10 is helped by the low or reduced coefficient of friction between the pet toy 10 and the bottom surface 24 of the sliding portion 14.

The body portion 12 can have an opening or hole 26 in the curved top portion 16 that enables a squeaking sound to be emitted therefrom. In one embodiment, the hole 26 is in the apex of the curved top portion 16; however, it is noted that the hole 26 can be in any suitable position on the pet toy 10. As can be understood, a noise making device 28 (squeaking device) or other device can be disposed in (or adjacent) the hole 26, such that when the body portion 12 is deformed from pressure being applied thereto, air is expelled out of the noise making device 28 and out of the squeaker hole 26 causing a noise.

Figure 7:
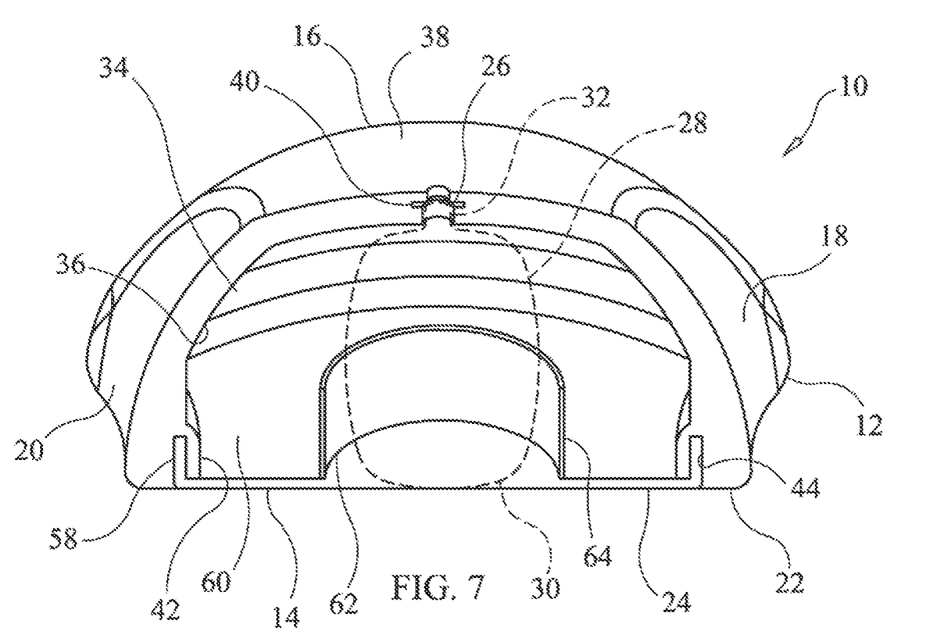
FIG. 7 is sectional view of the pet toy according to FIG. 1.

The noise making device 28 can be any suitable device. As shown in FIG. 7, in one embodiment, the noise making device is a flexible, plastic bulb 30 with air disposed in the interior thereof. The noise making device 28 also includes a neck portion or protrusion 32 connected to the bulb 30 that is disposed within the opening 26. The noise making device is configured such that, when compressed the air in the interior of the bulb 30 is expelled through the neck portion 32 causing a whistling or squeaking noise. However, it is noted that the noise making device 28 can be any suitable device that makes the appropriate or desired noise for use with the pet toy 10.

Figure 4:
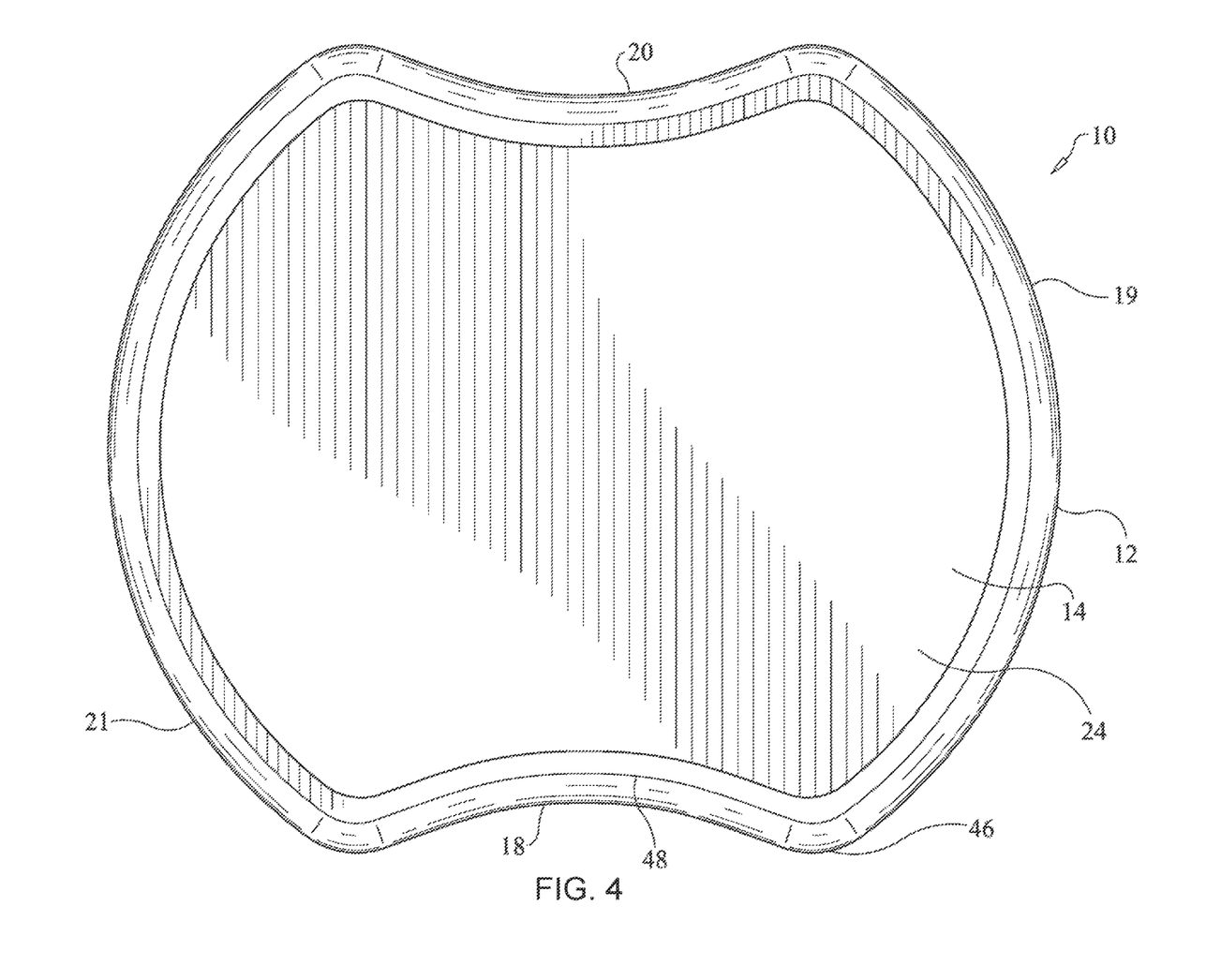
FIG. 4 is a bottom view of the pet toy according to FIG. 1.

As discussed above, the body portion 12 can have a domed or curved shape with two inwardly extending arcuate side portions (i.e., a first inwardly arcuate side 18 and a second inwardly arcuate side 20). The two inwardly arcuate side portions 18 and 20 can be on opposites side relative to each other. Thus, as can be seen in the FIG. 3, the two arcuate side portions 18 and 20 curve inwardly toward the middle of the body portion 12. In one embodiment, the two arcuate side portions 18 and 20 curve inwardly such that the minimum width of the body portion 12 is approximately at the longitudinal center of the body portion 12. That is, the body portion has a first rounded end 19 that reaches a maximum width at one end of the the two arcuate side portions 18 and 20, the two arcuate side portions 18 and 20 then curve inwardly to the minimum width. The the two arcuate side portions 18 and 20 curve outwardly to the maximum width of the body portion at the second rounded end 21. This configuration forms an hourglass shape, as seen in FIG. 4. Moreover, since the body portion 12 has a domed configuration, the arcuate side portions 18 and 20 have a maximum width adjacent the bottom surface 22 of the body portion. The width of the arcuate side portions 18 and 20 decreases as the arcuate side portions 18 and 20 approach the apex of the curved top portion 16. Thus, as shown in FIG. 5, for example, the arcuate side portions 18 and 20 can form a parabolic shape. However, it is noted that the pet toy 10 can have any suitable number of arcuate side portions or portions including one (1) or more than two (2). The body portion 12 is preferably about 2.87 inches high, about 5.85 inches wide and about 7 inches long. However, the body portion 12 can have any suitable configuration or dimensions. For example, the body portion 12 can be smaller or larger depending on the intended pet size.

As shown in FIG. 7, the body portion 12 is generally hollow so as to define a hollow interior portion 34. Thus, the body portion 12 has an inner surface 36 defining the hollow interior portion 34 and an outer surface 38. The squeaker hole 26 passes from the inner surface 36 to the outer surface 38 and can include a groove 40, if desired. The width of the body portion is formed so as to be by flexible. That is, the body portion is configured so as to be compressible by a force applied by a pet. Such flexibility is a function of the width or the body portion relative to the material with which the body portion is formed. Preferably, the body portion is resistant to deformation such that a considerable force must be applied before deformation. In one embodiment, the width between the inner surface 36 to the outer surface 38 increases adjacent the bottom surface 22. Such an increase in width can improve the stability of the pet toy 10, and provide a thicker base to accommodate the groove 44, described in more detail below.

The bottom surface 22 is bounded on an inner side by the inner surface 36 and on an outer side by the outer surface 38. Thus, as can be understood, the bottom surface 22 defines an opening 42 in the bottom of the body portion 12. In one embodiment, the opening 42 has the same or a similar configuration to an outer perimeter 46 of the body portion 12. However, it is noted that the opening 42 can have any configuration desired. Further, is desired, it is not necessary to have an opening 42 and the bottom surface 22 of the body portion 12 can be continuous such that the interior portion 34 is completely enclosed.

The bottom surface 22 of the body portion 12 can include a slot or groove 44 that traverses the entire periphery of the body portion 12. As seen in FIG. 7, the groove 44 can be offset so as to be closer to the inner surface 36 of the body portion 12 than the outer surface 38. The groove 44 generally has a length that is greater than the width thereof.

As shown in FIGS. 2 and 4-6, the sliding portion 14 is attached to a bottom surface 22 of the body portion 12 and is formed from polypropylene so as to have a reduced coefficient of friction with a surface on which the pet toy 10 is to slide. It is noted that the sliding portion 14 can be formed from any suitable material that would reduce the coefficient of friction between the floor and the toy.

The sliding portion 14 can have an outer perimeter 48 that has a shape or configuration that is generally similar to or the same as of the outer perimeter 46 of the body portion 12. Thus, the outer perimeter 48 of the sliding portion 14 can follow the contours of the outer perimeter 46 of the bottom surface 22 of the body portion 12. In particular, the sliding portion 14 can have a first inwardly extending arcuate side 50 and a second inwardly extending arcuate side 52. Further, the sliding portion 14 can have a first rounded end 54 and a second rounded end 56. However, in one embodiment, the area of the sliding portion 14 is similar to the area defined by the outer perimeter 48 of the body portion 12 but is a slightly smaller area.

Figure 8:
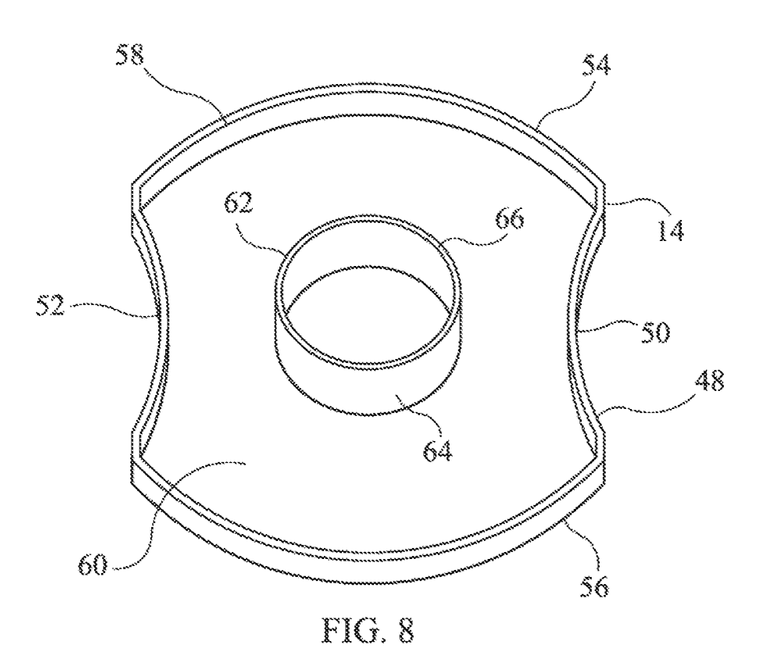
FIG. 8 is top perspective view of the sliding portion of the pet toy according to FIG. 1.

As shown in FIGS. 7 and 8, the outer perimeter 48 of the sliding portion 14 can have an upward extending flange 58 that is configured to fit in and/or be disposed in the groove 44 in the bottom surface 22 of the body portion 12. The flange 58 can be removable disposed in the groove 44 with a friction fit, or the flange 58 can be fixed in the groove 44 with an adhesive or in any other suitable manner. In one embodiment, the flange 58 can have a width that is greater than the width of the groove 44. Thus as can be understood, the groove 44 would fit into the groove 44 such that the sliding portion 14 is attached to the body portion 12 by a friction fit. Such a fit can be accomplished, since the body portion 12 can be formed from a semi rigid or flexible material. In this embodiment, the sliding portion 14 can be removed and reattached to the body portion 12.

The upper surface 60 of the sliding portion 14 can have a supporting structure 62 that prevents the body portion 12 from deforming in such a manner as to contact the upper surface 60 of the sliding portion 14. Thus, the supporting structure 62 can prevent damage to the sliding portion 14 or the noise making device 28. In the illustrated embodiment, the supporting structure 62 is a hollow cylindrical sleeve that is positioned in such a manner that it can prevent the noise making device 28 from being damaged. In other words, when the body portion 12 is depressed, the noise making device 28 will be surrounded by the wall 64 of the supporting structure 62. The top 66 of the wall 64 will contact the interior surface 36 of the body portion 12, preventing the noise making device 28 from being compressed between the upper surface 60 of the sliding portion 14 and the interior surface 36 of the body portion and being damaged. While the illustrated embodiment shows the supporting structure 62 as a hollow cylindrical sleeve, it is noted that the supporting structure 62 can have any suitable configuration.

In one embodiment, to produce the pet toy 10, the body portion 12 is formed having the sliding (bottom) portion 14 and the curved top portion 16. The curved top portion 16 includes the arcuate side portions 18 and 20. The body portion 12 can be molded using rubber or any other semi rigid or flexible material. Preferably, the body portion 12 includes the opening 42 in the bottom surface 22, so that the mold does not include an undercuts, making removal of the body portion 12 from the mold a relatively easy process. However, the body portion 12 can be formed in multiple sections or in any other manner desired. For example, in one embodiment, the body portion 12 can be formed with upper and lower sections that are coupled together. Thus, the body portion 12 can be completely enclosed with no opening in the bottom thereof.

The sliding portion 14 is formed from rigid plastic, such as polypropylene, so as to have a reduced coefficient of friction relative to a surface on which the pet toy 10 is to slide and is formed so as to be attachable to the body portion 12. The sliding portion 14 can be molded a single unitary member.

Prior to attaching the sliding portion to the body portion, the noise making device 28 can be attached to the body portion 12 with the neck portion 32 of the noise making device 28 being inserted into the squeaker opening 26. As can be understood, the neck portion 32 of the noise making device 28 can have a protrusion around the circumference thereof that can fit with in the groove 40 in the opening 26.

The flange 58 on the sliding portion 14 can then be inserted into the groove 44 in the bottom surface 22 of the body portion 12. The supporting structure 62 is configured and arranged such that the noise making device 28 is positioned within the inner area of the supporting structure 62.

In one embodiment, the flange 58 is sized and configured to frictionally fit within the groove 44, such that friction maintains the coupling between the body portion 12 and the sliding portion 14. However, as can be understood any other suitable manner of maintaining the attachment between the sliding portion 14 and the body portion 12 (adhesive, glue, heat molding, etc.) can be used.

The pet toy 10 can be positioned with the sliding portion 14 on a surface. As illustrated in FIG. 5, the sliding portion 14 extends slightly beyond the body portion 12. Thus, the body portion 12 is disposed away from the surface and preferably only the sliding portion 14 touches the surface. This configuration improves the slidability of the pet toy 10 and enables the body portion 12 to be formed from a different material than the sliding portion 14. In use, a pet will step on or put pressure on the body portion 12 of the pet toy 10. In one embodiment, the body portion 12 will flex or compress, which will in turn compress the noise making device 28. The noise making device will expel air through the neck portion 32 and out of the opening 26 causing a squeak or other desired noise. Additionally, the curved configuration of the body portion 12 and the reduced frictional coefficient between the surface and the sliding portion 14 will cause the pet toy to slide out from under the paw of the pet and slide across the surface. This, sliding and noise will intrigue the pet and cause the pet to chase after the pet toy and repeat the process.

The pet toy 10 described herein will increase the occupation of a pet's attention, while also improving the pets exercise, since the pet will chase the pet toy 10 through the indoor area of a home or house or other indoor structure. Further, the pet toy 10 will improve the occupation of a pet's attention without the need for additional food or treats.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, terms, such "section" and "portion", when used in the singular can have the dual meaning of a single part or a plurality of parts. The term "configured" as used herein to describe a component, section or part of a device that is constructed to carry out the desired function.

The terms of degree such as "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet toy comprising:
a body portion having a curved top portion with a pair of inwardly extending arcuate side portions on opposite sides of the curved top portion, the inwardly extending arcuate side portions each having a crescent shape as viewed from above such that a minimum width of the body portion is approximately at a longitudinal center of the body portion and is measured from one of the inwardly extending arcuate portions to the other of the inwardly extending arcuate portions, the body portion having a hollow interior;
a noise making device having a flexible bulb; and
a sliding portion attached to the body portion, the sliding portion defining a bottom surface and formed from rigid plastic so as to have a reduced coefficient of friction relative to a surface on which the pet toy is to slide, the sliding portion having a cylindrically shaped wall located within the hollow interior with a lower portion of the flexible bulb being disposed within the cylindrically shaped wall adjacent to the bottom surface and an upper portion of the flexible bulb extending upward out of the cylindrically shaped wall to the curved top portion of the body portion with an opening of the flexile bulb being exposed along an outer surface of the curved top portion of the body portion.

2. A pet toy comprising
a body portion having a curved top portion with an inwardly extending arcuate side portion such that a minimum width of the body portion is approximately at a longitudinal center of the body portion, the body portion having a hollow interior with an air operated noise making device, the air operated noise making device having a flexible bulb; and
a sliding portion attached to a bottom surface of the body portion, the sliding portion defining a bottom surface and formed from rigid plastic so as to have a reduced coefficient of friction relative to a surface on which the pet toy is to slide, the sliding portion having a cylindrically shaped wall located within the hollow interior with a lower portion of the flexible bulb being disposed within the cylindrically shaped wall adjacent to the bottom surface and an upper portion of the flexible bulb extending upward out of the cylindrically shaped wall to the curved top portion of the body portion with an opening of the flexile bulb being exposed along an outer surface of the curved top portion of the body portion.

3. The pet toy of claim 1, wherein
the body portion is formed from a flexible material.

4. The pet toy of claim 1, wherein
the sliding portion includes a support member on an upper surface thereof.

5. The pet toy of claim 1, wherein
the rigid plastic is polypropylene.

6. A method of producing a pet toy, the method comprising:
forming a body portion having a bottom portion and a curved top portion, the curved top portion including a pair of inwardly extending arcuate side portions formed at opposite sides of the curved top portion each having a crescent shape as viewed from above, such that a minimum width of the body portion is approximately at a longitudinal center of the body portion and is measured from one of the inwardly extending arcuate portions to the other of the inwardly extending arcuate portions, the body portion having a hollow interior;
inserting a noise making device having a flexible bulb into the body portion;
forming a sliding portion from rigid plastic so as to have a reduced coefficient of friction relative to a surface on which the pet toy is to slide, the sliding portion having a cylindrically shaped wall located within the hollow interior of the body portion such that the sliding portion defines a bottom surface of the pet toy with a lower portion of the flexible bulb being disposed within the cylindrically shaped wall adjacent to the bottom surface of the body portion and an upper portion of the flexible bulb extending upward out of the cylindrically shaped wall to the curved top portion of the body portion with an opening of the flexible bulb being exposed along an outer upper surface of the curved top portion of the body portion; and
attaching the sliding portion to the bottom portion of the body portion.

7. The method of claim 6, wherein
the forming the body portion includes forming the body portion from a flexible material.

8. The method of claim 6, wherein
the forming the sliding portion includes forming the sliding portion with a support member on an upper surface thereof.

9. The method of claim 6, wherein
the forming the sliding portion includes forming the sliding portion from polypropylene.

* * * * *